US010368664B1

(12) United States Patent
Mermelstein

(10) Patent No.: US 10,368,664 B1
(45) Date of Patent: Aug. 6, 2019

(54) PARTIAL SLIPCOVER

(71) Applicant: Joel Mermelstein, Thiells, NY (US)

(72) Inventor: Joel Mermelstein, Thiells, NY (US)

( * ) Notice: Subject to any disclaimer, the term of this patent is extended or adjusted under 35 U.S.C. 154(b) by 486 days.

(21) Appl. No.: 15/257,032

(22) Filed: Sep. 6, 2016

(51) Int. Cl.
*A47G 9/02* (2006.01)
*A47G 9/04* (2006.01)
*A47C 7/62* (2006.01)

(52) U.S. Cl.
CPC .......... *A47G 9/0253* (2013.01); *A47C 7/386* (2013.01); *A47G 9/04* (2013.01); *D06M 2200/10* (2013.01); *D06M 2200/12* (2013.01)

(58) Field of Classification Search
CPC ...... A47G 9/0238; A47G 9/0253; A47G 9/04; D06M 2200/10; D06M 2200/12; A47C 7/386; A01K 1/0353
See application file for complete search history.

(56) References Cited

U.S. PATENT DOCUMENTS

| | | | | |
|---|---|---|---|---|
| 3,423,774 A | * | 1/1969 | Streetman | A42B 1/045 2/202 |
| 3,654,059 A | * | 4/1972 | Zisblatt | A47C 7/386 156/289 |
| 5,159,727 A | * | 11/1992 | McCracken | A47D 13/083 5/482 |
| 5,581,833 A | * | 12/1996 | Zenoff | A47C 7/546 108/43 |
| 5,718,010 A | * | 2/1998 | Beier | A47G 9/10 40/638 |
| 5,727,266 A | * | 3/1998 | Pang | A47G 9/0253 5/490 |
| 5,787,523 A | * | 8/1998 | Lindberg | A47G 9/0238 5/484 |
| 5,938,648 A | * | 8/1999 | LaVon | A61F 13/15203 604/358 |
| 6,038,720 A | * | 3/2000 | Matthews | A47C 7/383 5/636 |
| 6,189,169 B1 | * | 2/2001 | Marcotte | A47D 13/083 5/490 |
| 6,427,268 B1 | * | 8/2002 | Davis | A47G 9/0253 5/490 |
| 6,484,337 B1 | | 11/2002 | Moe | |
| 6,708,354 B1 | * | 3/2004 | Carter | A47D 13/083 128/845 |
| 6,851,143 B2 | | 2/2005 | Brown | |
| 7,111,347 B1 | | 9/2006 | Cottrell | |
| 7,155,763 B2 | * | 1/2007 | North | A41B 13/06 5/482 |
| 8,166,587 B2 | | 5/2012 | Collins | |
| 8,375,491 B2 | * | 2/2013 | Hinderliter, II | A47D 13/08 108/43 |
| D699,981 S | | 2/2014 | Kummerfeld | |

(Continued)

FOREIGN PATENT DOCUMENTS

WO 2012040631 A1 7/2013

*Primary Examiner* — Robert G Santos
*Assistant Examiner* — David R Hare
(74) *Attorney, Agent, or Firm* — Kyle A. Fletcher, Esq.

(57) ABSTRACT

The partial slipcover is a protective barrier adapted for use with a pillow. The partial slipcover is a composite textile that protects the pillow from staining. The partial slipcover is removably attached to the pillow thereby allowing the partial slipcover to be removed and replaced for cleaning. The partial slipcover comprises a composite textile and a fastener.

17 Claims, 3 Drawing Sheets

(56) References Cited

U.S. PATENT DOCUMENTS

| | | | |
|---|---|---|---|
| 9,113,719 B2 | 8/2015 | Inabayashi | |
| 2003/0121101 A1* | 7/2003 | Corzani | A47C 27/006 |
| | | | 5/487 |
| 2006/0174411 A1* | 8/2006 | Merlini | A47G 9/1045 |
| | | | 5/490 |
| 2007/0161490 A1* | 7/2007 | Srivastava | A47C 7/386 |
| | | | 493/464 |
| 2008/0235870 A1* | 10/2008 | Heide | A47G 9/04 |
| | | | 5/484 |
| 2008/0251032 A1* | 10/2008 | Rector | A01K 1/0353 |
| | | | 119/650 |
| 2011/0159299 A1* | 6/2011 | Linforf | B05D 1/36 |
| | | | 428/447 |
| 2012/0073058 A1 | 3/2012 | Sclart | |
| 2013/0260076 A1* | 10/2013 | Hejazifar | A47G 9/0207 |
| | | | 428/58 |
| 2014/0261193 A1* | 9/2014 | Smith | A01K 1/0353 |
| | | | 119/28.5 |

\* cited by examiner

PARTIAL SLIPCOVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic accessories including furniture, more specifically, a textile furnishing for a nursery adapted for use in feeding an infant.

SUMMARY OF INVENTION

The partial slipcover is a protective barrier adapted for use with a nursing pillow. The partial slipcover is a composite textile that protects the nursing pillow from staining. The partial slipcover is removably attached to the nursing pillow thereby allowing the partial slipcover to be removed and replaced for cleaning.

These together with additional objects, features and advantages of the partial slipcover will be readily apparent to those of ordinary skill in the art upon reading the following detailed description of the presently preferred, but nonetheless illustrative, embodiments when taken in conjunction with the accompanying drawings.

In this respect, before explaining the current embodiments of the partial slipcover in detail, it is to be understood that the partial slipcover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the partial slipcover.

It is therefore important that the claims be regarded as including such equivalent construction insofar as they do not depart from the spirit and scope of the partial slipcover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
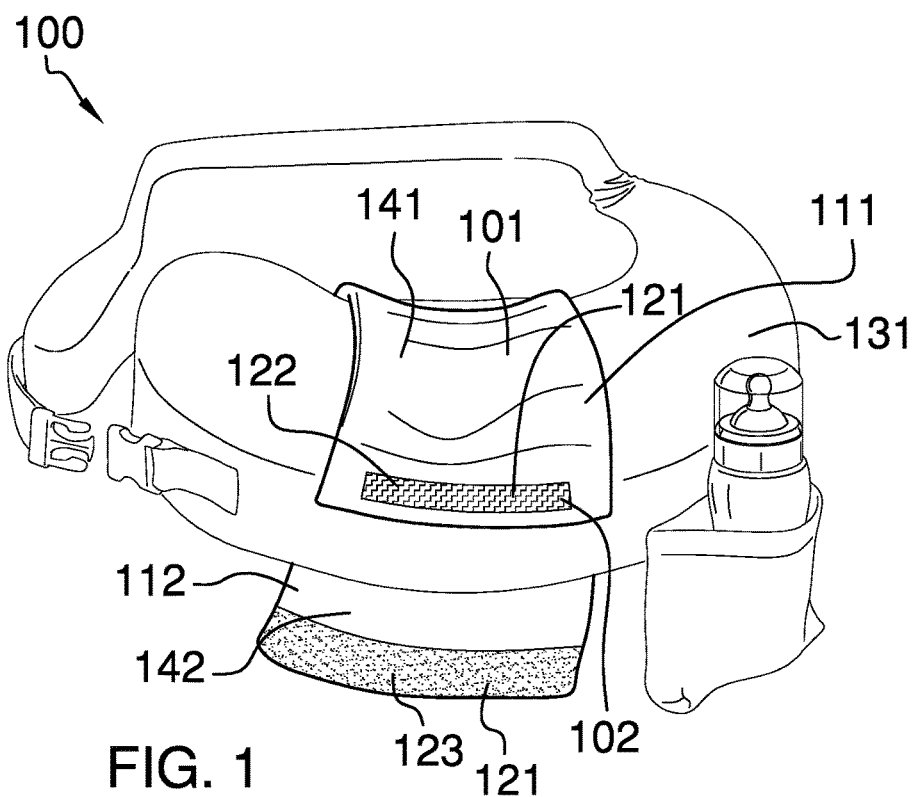
FIG. 1 is an in use view of an embodiment of the disclosure.
Figure 2:
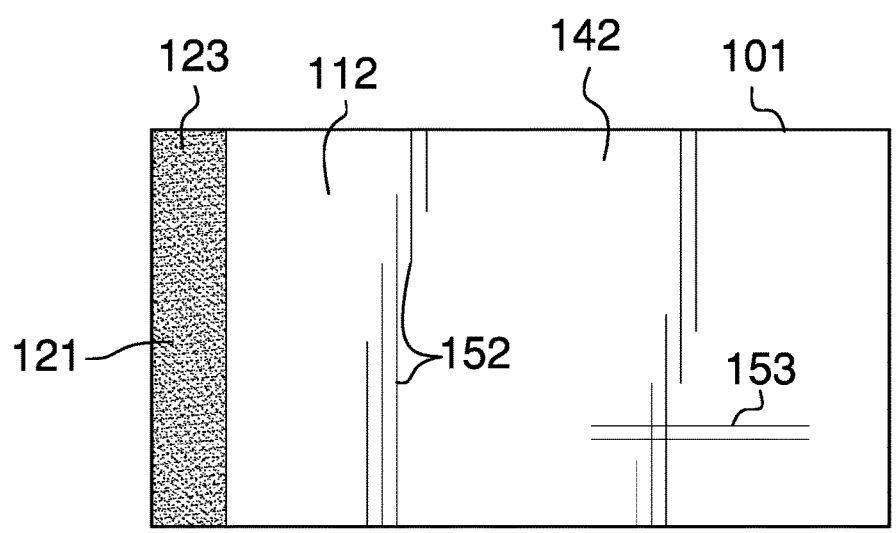
FIG. 2 is a bottom view of an embodiment of the disclosure.
Figure 3:
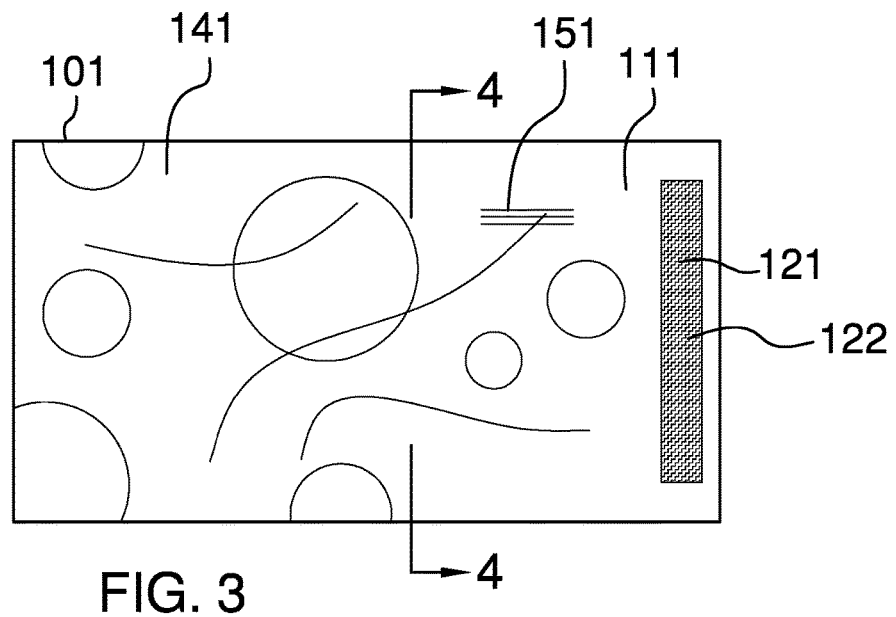
FIG. 3 is a top view of an embodiment of the disclosure.
Figure 4:
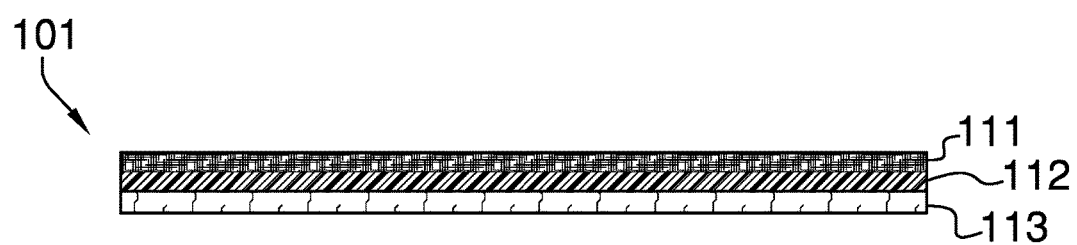
FIG. 4 is a cross-sectional view of an embodiment of the disclosure across 4-4 as shown in FIG. 3.
Figure 5:
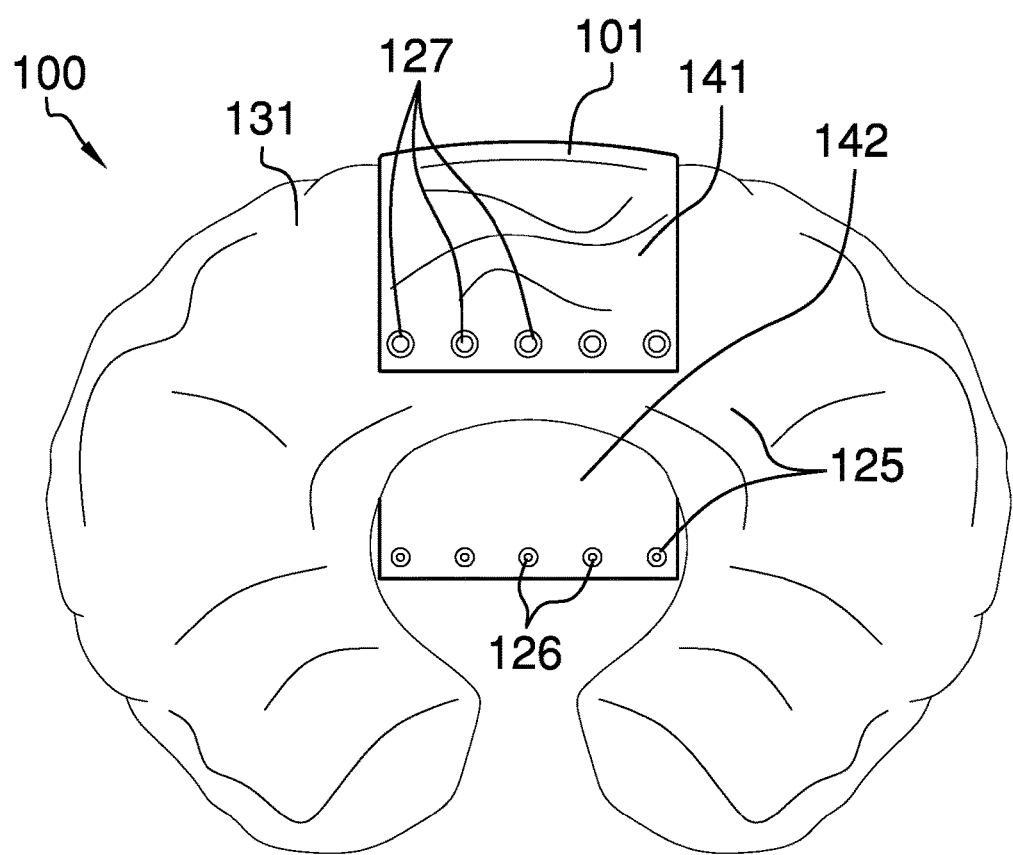
FIG. 5 is an in use view of an alternative embodiment of the disclosure.

Detailed reference will now be made to one or more potential embodiments of the disclosure, which are illustrated in FIGS. 1 through 5.

The partial slipcover 100 (hereinafter invention) comprises a composite textile 101 and a fastener 102. The fastener 102 is attached to the composite textile 101. The invention 100 is a protective barrier adapted for use with a nursing pillow 131. The invention 100 is a composite textile 101 that protects the nursing pillow 131 from staining. The invention 100 is removably attached to the nursing pillow 131 thereby allowing the invention 100 to be removed and replaced for cleaning.

The composite textile 101 includes a first sheeting 111 and a second sheeting 112. The first sheeting 111 is a wicking layer that forms the exterior surface 141 of the invention 100. The first sheeting 111 is an engineered textile formed from hydrophobic yarns. The purpose of the first sheeting 111 is to draw liquid away from the exterior surface 141 towards the second sheeting 112. The second sheeting 112 is an absorbent layer that is attached to the first sheeting 111 such that, as shown most clearly in FIG. 4, the first sheeting 111 and the second sheeting 112 from layers within the composite textile 101. In all potential embodiments of the disclosure, the second sheeting 112 either: 1) forms the interior surface 142 of the invention 100; or, 2) is proximal to the interior surface 142 of the invention 100 relative to the first sheeting 111. The purpose of the second sheeting 112 is to act as a reservoir that draws moisture away from the exterior surface 141 through capillary action. It is preferred that the second sheeting 112 be a textile formed from hydrophilic yarns. The use of microfiber yarns is preferred. Methods to attach sheetings to form composite textiles are well known and documented in the textile arts.

The fastener 102 is a readily and commercially available fastener 102. The fastener 102 further comprises a first element and a second element. The first element attaches to the exterior surface 141 of the invention 100. The second element attaches to the interior surface 142 of the invention 100 such that the composite textile 101 is looped, or wrapped, around the nursing pillow 131 and held in position by attaching the second element to the first element. The invention 100 attaches to the nursing pillow 131 such that the exterior surface 141 is distal from the nursing pillow 131.

In a first potential embodiment of the disclosure, the first sheeting 111 is a textile formed from a first plurality of yarns 151 formed from a synthetic fiber. The synthetic fiber is selected from the group consisting of polyester, polypropylene, or nylon. Wherein the first sheeting 111 is further finished with perfluorobutanesulfonic acid (CAS 375-73-5). The second sheeting 112 is formed from a terry fabric formed from a second plurality of yarns 152. The second plurality of yarns 152 is selected from the group consisting of a plurality of cotton yarn or a plurality of microfiber yarns. The fastener 102 is a hook and loop fastener 121 that further comprises a first hook or loop surface 122 and a second hook or loop surface 123. The first hook or loop surface 122 is the first element. The second hook or loop surface 123 is the second element.

In a second potential embodiment of the disclosure, the first sheeting 111 is a textile formed from a first plurality of yarns 151 formed from a synthetic fiber. The synthetic fiber is polytetrafluoroethylene (CAS 9002-84-0). The second sheeting 112 is formed from a terry fabric formed from a second plurality of yarns 152. The second plurality of yarns 152 is selected from the group consisting of a plurality of cotton yarn or a plurality of microfiber yarns. The fastener 102 is a hook and loop fastener 121 that further comprises a first hook or loop surface 122 and a second hook or loop surface 123. The first hook or loop surface 122 is the first element. The second hook or loop surface 123 is the second element.

In a third potential embodiment of the disclosure, the first sheeting 111 is a textile formed from a first plurality of yarns 151 formed from a synthetic fiber. The synthetic fiber is selected from the group consisting of polyester, polypropylene, or nylon. Wherein the first sheeting 111 is further finished with perfluorobutanesulfonic acid (CAS 375-73-5). The second sheeting 112 is formed from a terry fabric formed from a second plurality of yarns 152 and a third plurality of yarns 153. The second plurality of yarns 152 is selected from the group consisting of a plurality of cotton yarn or a plurality of microfiber yarns. The third plurality of yarns 153 is formed from an elastomeric yarn. The second sheeting 112 is under tension when attached to the first sheeting 111 such that the invention 100 is able to expand and contract when placed around the nursing pillow 131. Methods to form elastic composite textiles in this fashion are well known and documented in the textile arts. The fastener 102 is a hook and loop fastener 121 that further comprises a first hook or loop surface 122 and a second hook or loop surface 123. The first hook or loop surface 122 is the first element. The second hook or loop surface 123 is the second element.

In a fourth potential embodiment of the disclosure, the first sheeting 111 is a textile formed from a first plurality of yarns 151 formed from a synthetic fiber. The synthetic fiber is polytetrafluoroethylene (CAS 9002-84-0). The second sheeting 112 is formed from a terry fabric formed from a second plurality of yarns 152 and a third plurality of yarns 153. The second plurality of yarns 152 is selected from the group consisting of a plurality of cotton yarn or a plurality of microfiber yarns. The third plurality of yarns 153 is formed from an elastomeric yarn. The second sheeting 112 is under tension when attached to the first sheeting 111 such that the invention 100 is able to expand and contract when placed around the nursing pillow 131. Methods to form elastic composite textiles in this fashion are well known and documented in the textile arts. The fastener 102 is a hook and loop fastener 121 that further comprises a first hook or loop surface 122 and a second hook or loop surface 123. The first hook or loop surface 122 is the first element. The second hook or loop surface 123 is the second element.

In a fifth potential embodiment of the disclosure, the first sheeting 111 is a textile formed from a first plurality of yarns 151 formed from a synthetic fiber. The synthetic fiber is selected from the group consisting of polyester, polypropylene, or nylon. Wherein the first sheeting 111 is further finished with perfluorobutanesulfonic acid (CAS 375-73-5). The second sheeting 112 is formed from a terry fabric formed from a second plurality of yarns 152. The second plurality of yarns 152 is selected from the group consisting of a plurality of cotton yarn or a plurality of microfiber yarns. As shown most clearly in FIG. 5, the fastener 102 is a plurality of snaps 125 that further comprises a plurality of male components 126 and a plurality of female components 127. The plurality of female components 127 is the first element. The plurality of male components 126 is the second element.

In a sixth potential embodiment of the disclosure, the first sheeting 111 is a textile formed from a first plurality of yarns 151 formed from a synthetic fiber. The synthetic fiber is polytetrafluoroethylene (CAS 9002-84-0). The second sheeting 112 is formed from a terry fabric formed from a second plurality of yarns 152. The second plurality of yarns 152 is selected from the group consisting of a plurality of cotton yarn or a plurality of microfiber yarns. As shown most clearly in FIG. 5, the fastener 102 is a plurality of snaps 125 that further comprises a plurality of male components 126 and a plurality of female components 127. The plurality of female components 127 is the first element. The plurality of male components 126 is the second element.

In a seventh potential embodiment of the disclosure, the first sheeting 111 is a textile formed from a first plurality of yarns 151 formed from a synthetic fiber. The synthetic fiber is selected from the group consisting of polyester, polypropylene, or nylon. Wherein the first sheeting 111 is further finished with perfluorobutanesulfonic acid (CAS 375-73-5). The second sheeting 112 is formed from a terry fabric formed from a second plurality of yarns 152 and a third plurality of yarns 153. The second plurality of yarns 152 is selected from the group consisting of a plurality of cotton yarn or a plurality of microfiber yarns. The third plurality of yarns 153 is formed from an elastomeric yarn. The second sheeting 112 is under tension when attached to the first sheeting 111 such that the invention 100 is able to expand and contract when placed around the nursing pillow 131. Methods to form elastic composite textiles in this fashion are well known and documented in the textile arts. As shown most clearly in FIG. 5, the fastener 102 is a plurality of snaps 125 that further comprises a plurality of male components 126 and a plurality of female components 127. The plurality of female components 127 is the first element. The plurality of male components 126 is the second element.

In an eighth potential embodiment of the disclosure, the first sheeting 111 is a textile formed from a first plurality of yarns 151 formed from a synthetic fiber. The synthetic fiber is polytetrafluoroethylene (CAS 9002-84-0). The second sheeting 112 is formed from a terry fabric formed from a second plurality of yarns 152 and a third plurality of yarns 153. The second plurality of yarns 152 is selected from the group consisting of a plurality of cotton yarn or a plurality of microfiber yarns. The third plurality of yarns 153 is formed from an elastomeric yarn. The second sheeting 112 is under tension when attached to the first sheeting 111 such that the invention 100 is able to expand and contract when placed around the nursing pillow 131. Methods to form elastic composite textiles in this fashion are well known and documented in the textile arts. As shown most clearly in FIG. 5, the fastener 102 is a plurality of snaps 125 that further comprises a plurality of male components 126 and a plurality of female components 127. The plurality of female components 127 is the first element. The plurality of male components 126 is the second element.

The composite textile 101 can further comprises a third sheeting 113 that is attached to the surface of the second sheeting 112 that is distal from the first sheeting 111. Suitable plastics for the third sheeting 113 include, but are not limited to, polyethylene or polypropylene. The purpose of the third sheeting 113 is to provide a waterproof barrier between the second sheeting 112 and the nursing pillow 131.

The following definitions were used in this disclosure:

Composite Textile: As used in this disclosure, a composite textile is a multilayer fabric made of two or more joined layers of textile or sheeting materials.

Exterior: As used in this disclosure, the exterior is use as a relational term that implies that an object is not contained within the boundary of a structure or a space.

Elastic: As used in this disclosure, an elastic is a material or object that deforms when a force is applied to it and that is able to return to its original shape after the force is removed. A material that exhibits these qualities is also referred to as an elastomeric material.

Elastic band: As used in this disclosure, an elastic band is a loop of textile that is formed using elastic material that can stretched. Alternatively, the elastic band can be sheeting that is formed from latex, spandex, or an elastic plastic film that can be stretched.

Elastic Textile: As used in this disclosure, an elastic textile is a textile that contains elastic yarns as some of the yarns that make up the textile. An elastic textile is constructed such that the elastic textile will stretch when a force is applied and will return to its original shape when after the force is removed.

Elastic Yarn: As used in this disclosure, an elastic yarn is a yarn formed from elastomeric materials.

Fastener: As used in this disclosure, a fastener is a device that is used to join or affix two objects. Fasteners generally comprise a first element which is attached to the first object and a second element which is attached to the second object such that the first element and the second element join to affix the first object and the second object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook or loop surface" with the understanding that when the two objects are fastened together one of the two objects will have a hook surface and the remaining object will have the loop surface.

Interior: As used in this disclosure, the interior is use as a relational term that implies that an object is contained within the boundary of a structure or a space.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Microfiber Yarn: As used in this disclosure, a yarn is said to be a microfiber yarn when the average number of filaments or fibers contained in a cross-section of the yarn is greater than the denier of the yarn. Stated differently, a microfiber yarn is a yarn made from fibers or filaments with an average fineness, as measured by denier, of less than one denier. Please note: This definition is similar to but differs from the definition of microfiber yarn that is generally accepted in the textile industry. This definition of is preferred in this disclosure because of the relative simplicity of the definition and because the difference between the two definitions has little commercial or practical relevance.

Microfiber Fabric: As used in this disclosure, a microfiber fabric is a fabric that is formed from microfiber yarns.

Nursing Pillow: As used in this disclosure, a nursing pillow is a ring shaped cushion that is worn around the waist or torso of a nursing mother for the purpose of supporting an infant during nursing.

Perfluorobutanesulfonic acid: As used in this disclosure, perfluorobutanesulfonic acid (CAS 375-73-5) is a surfactant, technically a fluorosurfactant, which is commonly applied to a textile as a water repellant.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, or an ultrasonically bonded seam.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, sheeting is a material, such as cloth, plastic, or metal foils, in the form of a thin flexible layer or layers.

Snap: As used in this disclosure, a snap is a fastener that comprises a male component and a female component. The snap is engaged by pressing the male component into the female component.

Terry Fabric: As used in this disclosure, a terry fabric is a textile that is formed with a plurality of uncut loops on both sides of the fabric. The plurality of uncut loops make a terry fabric highly water absorbent. Terry fabrics often comprise cotton yarns. Terry cloth is a synonym for terry fabric.

Textile: As used in this disclosure, a textile is a material that is woven, knitted, braided or felted. Synonyms in common usage for this definition include fabric and cloth.

Yarn: As used in this disclosure, a yarn is continuous strand of textile fibers and filaments. Yarns are generally used in the production of fabrics.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An accessory comprising
a composite textile and a fastener;
wherein the fastener is attached to the composite textile;
wherein the accessory is a protective barrier adapted for use with a pillow;
wherein the accessory protects the pillow from staining;
wherein the accessory is removably attached to the pillow;
wherein the composite textile comprises a first sheeting and a second sheeting;
wherein the first sheeting is a wicking layer that forms the exterior surface of the accessory;
wherein the first sheeting is an engineered textile formed from hydrophobic yarns;
wherein the first sheeting is to draw liquid away from the exterior surface towards the second sheeting;
wherein the second sheeting attaches to the first sheeting such that, the first sheeting and the second sheeting form layers within the composite textile;
wherein the composite textile is looped around the pillow;
wherein the fastener further comprises a first element and a second element;
wherein the first element attaches to the exterior surface of the accessory;
wherein the second element attaches to the interior surface of the accessory;
wherein the composite textile in position relative to the pillow by attaching the second element to the first element;
wherein the accessory attaches to the pillow such that the exterior surface is distal from the pillow;
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a hook and loop fastener that further comprises a first hook or loop surface and a second hook or loop surface;
wherein the first hook or loop surface is the first element;
wherein the second hook or loop surface is the second element.

2. The accessory according to claim 1 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a hook and loop fastener that further comprises a first hook or loop surface and a second hook or loop surface;
wherein the first hook or loop surface is the first element;
wherein the second hook or loop surface is the second element.

3. The accessory according to claim 1 wherein
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around the pillow;
wherein the fastener is a hook and loop fastener that further comprises a first hook or loop surface and a second hook or loop surface;
wherein the first hook or loop surface is the first element;
wherein the second hook or loop surface is the second element.

4. The accessory according to claim 1 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around a nursing pillow;
wherein the fastener is a hook and loop fastener that further comprises a first hook or loop surface and a second hook or loop surface;
wherein the first hook or loop surface is the first element;
wherein the second hook or loop surface is the second element.

5. The accessory according to claim 1 wherein
wherein the first sheeting is a textile formed from a first plurality of yarns formed from a synthetic fiber;
wherein the synthetic fiber is selected from the group consisting of polyester, polypropylene, or nylon;

wherein the first sheeting is further finished with perfluorobutanesulfonic acid (CAS 375-73-5);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a plurality of snaps that further comprises a plurality of male components and a plurality of female components;
wherein the plurality of female components is the first element;
wherein the plurality of male components is the second element.

6. The accessory according to claim 1 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a plurality of snaps that further comprises a plurality of male components and a plurality of female components;
wherein the plurality of female components is the first element;
wherein the plurality of male components is the second element.

7. The accessory according to claim 1 wherein
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around a nursing pillow;
wherein the fastener is a plurality of snaps that further comprises a plurality of male components and a plurality of female components;
wherein the plurality of female components is the first element;
wherein the plurality of male components is the second element.

8. The accessory according to claim 1 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around a nursing pillow;
wherein the fastener is a plurality of snaps that further comprises a plurality of male components and a plurality of female components;
wherein the plurality of female components is the first element;
wherein the plurality of male components is the second element.

9. The accessory according to claim 1 wherein
wherein the composite textile can further comprises a third sheeting that is attached to the surface of the second sheeting that is distal from the first sheeting;
wherein suitable plastics for the third sheeting is a waterproof barrier formed from a polymer.

10. The accessory according to claim 9 wherein
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a hook and loop fastener that further comprises a first hook or loop surface and a second hook or loop surface;
wherein the first hook or loop surface is the first element;
wherein the second hook or loop surface is the second element.

11. The accessory according to claim 9 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a hook and loop fastener that further comprises a first hook or loop surface and a second hook or loop surface;
wherein the first hook or loop surface is the first element;
wherein the second hook or loop surface is the second element.

12. The accessory according to claim 9 wherein
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;

wherein the accessory is able to expand and contract when the accessory is placed around the pillow;
wherein the fastener is a hook and loop fastener that further comprises a first hook or loop surface and a second hook or loop surface;
wherein the first hook or loop surface is the first element;
wherein the second hook or loop surface is the second element.

13. The accessory according to claim 9 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around a nursing pillow;
wherein the fastener is a hook and loop fastener that further comprises a first hook or loop surface and a second hook or loop surface;
wherein the first hook or loop surface is the first element;
wherein the second hook or loop surface is the second element.

14. The accessory according to claim 9 wherein
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a plurality of snaps that further comprises a plurality of male components and a plurality of female components;
wherein the plurality of female components is the first element;
wherein the plurality of male components is the second element.

15. The accessory according to claim 9 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns;
wherein the second plurality of yarns is selected from the group consisting of a plurality of cotton yarn or a plurality of microfiber yarns;
wherein the fastener is a plurality of snaps that further comprises a plurality of male components and a plurality of female components;
wherein the plurality of female components is the first element;
wherein the plurality of male components is the second element.

16. The accessory according to claim 9 wherein
wherein the first sheeting is a textile formed from a first plurality of yarns formed from a synthetic fiber;
wherein the synthetic fiber is selected from the group consisting of polyester, polypropylene, or nylon;
wherein the first sheeting is further finished with perfluorobutanesulfonic acid (CAS 375-73-5);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around the pillow;
wherein the fastener is a plurality of snaps that further comprises a plurality of male components and a plurality of female components;
wherein the plurality of female components is the first element;
wherein the plurality of male components is the second element.

17. The accessory according to claim 9 wherein
wherein the first sheeting is a textile formed from a first plurality of yarns formed from a synthetic fiber;
wherein the synthetic fiber is polytetrafluoroethylene (CAS 9002-84-0);
wherein the second sheeting is formed from a terry fabric formed from a second plurality of yarns and a third plurality of yarns;
wherein the second plurality of yarns is selected from the group consisting of a plurality of cotton yarn or a plurality of microfiber yarns;
wherein the third plurality of yarns is formed from an elastomeric yarn;
wherein the accessory is able to expand and contract when the accessory is placed around the pillow;
wherein the fastener is a plurality of snaps that further comprises a plurality of male components and a plurality of female components;
wherein the plurality of female components is the first element;
wherein the plurality of male components is the second element.

* * * * *